US005827591A

United States Patent [19]

Blok et al.

[11] Patent Number: 5,827,591

[45] Date of Patent: Oct. 27, 1998

[54] REMOVABLE ADHESIVE NOTES FOR AN INDUSTRIAL SETTING

[75] Inventors: Lana M. Blok, Bayside, Wis.; Hugh M. McKenna, Banbury, England

[73] Assignee: Tricor Direct, Inc., Branford, Conn.

[21] Appl. No.: 727,205

[22] Filed: Oct. 8, 1996

[51] Int. Cl.[6] ........................................ C09J 7/02

[52] U.S. Cl. ........................ 428/41.7; 428/41.8; 428/42.2; 428/43; 428/354

[58] Field of Search ................................ 428/41.7, 41.8, 428/42.2, 354, 343, 43

[56] References Cited

U.S. PATENT DOCUMENTS

| | | | |
|---|---|---|---|
| 2,248,317 | 7/1941 | Van Cleef | 206/57 |
| 3,691,140 | 9/1972 | Silver | 260/78.5 |
| 4,005,247 | 1/1977 | Graham | 525/15 |
| 4,077,926 | 3/1978 | Sanderson et al. | 260/29.6 TA |
| 4,136,699 | 1/1979 | Collins et al. | 128/290 R |
| 4,145,465 | 3/1979 | Sanderson et al. | 428/31 |
| 4,185,051 | 1/1980 | McKenna, Jr. et al. | 525/370 |
| 4,292,231 | 9/1981 | Gabriel et al. | 260/33.4 UR |
| 4,360,638 | 11/1982 | Bartman | 524/286 |
| 4,423,182 | 12/1983 | Bartman | 524/367 |
| 4,558,888 | 12/1985 | Hanson et al. | 281/283 |
| 4,560,753 | 12/1985 | Lesher et al. | 544/279 |
| 4,590,109 | 5/1986 | Holmberg | 428/40 |
| 4,614,183 | 9/1986 | McCracken et al. | 128/132 R |
| 4,626,575 | 12/1986 | Goel | 525/329.5 |
| 4,650,706 | 3/1987 | Emmel | 428/40 |
| 4,677,167 | 6/1987 | Goel | 525/375 |
| 4,680,333 | 7/1987 | Davis | 524/394 |
| 4,684,685 | 8/1987 | Shuman et al. | 524/270 |
| 4,704,110 | 11/1987 | Raykovitz et al. | 604/366 |

(List continued on next page.)

*Primary Examiner*—Jenna Davis
*Attorney, Agent, or Firm*—Whyte Hirschboeck Dudek SC

[57] ABSTRACT

Pads for posting removable adhesive sheets capable of receiving markings are disclosed. The pads comprise a stack of a plurality of adhesive sheets having release sheets adhered to the back of each, wherein each adhesive sheet, when applied to a surface, is removable without leaving an adhesive residue. The adhesive sheets comprise a flexible polymer film, polymer-reinforced sheet or cloth having a Taber stiffness of not less than 0.03 measured according to ASTM D747, a front side capable of receiving markings and a back side substantially covered with a pressure sensitive adhesive having an initial tack value of at least 200 g measured according to ASTM D2979 on a Polyken™ probe tack tester, an adhesive tack sufficient to prevent conformability failure of the adhesive sheet after 10 hours conformability testing, and an adhesive strength of at least 100N/m according to ASTM D1000 and each release sheet covers at least 50 percent of the pressure sensitive adhesive on the back of each adhesive sheet.

A process for making such pads and a kit for dispensing adhesive sheet/release sheet combinations are also disclosed.

The pads, processes and kits of this invention are useful for posting robust temporary and semi-permanent removable notes in an industrial or commercial setting.

33 Claims, 3 Drawing Sheets

U.S. PATENT DOCUMENTS

| | | | |
|---|---|---|---|
| 4,713,274 | 12/1987 | Minor . | |
| 4,716,194 | 12/1987 | Walker et al. | 524/806 |
| 4,726,982 | 2/1988 | Traynor et al. | 428/213 |
| 4,728,572 | 3/1988 | Davis | 428/355 |
| 4,728,684 | 3/1988 | Kadowaki et al. | 524/271 |
| 4,822,676 | 4/1989 | Mudge | 428/343 |
| 4,837,062 | 6/1989 | Dunshee et al. | 428/41 |
| 4,842,919 | 6/1989 | David et al. | 428/40 |
| 4,844,246 | 7/1989 | Harrison et al. | 206/223 |
| 4,895,746 | 1/1990 | Mertens | 428/40 |
| 4,967,740 | 11/1990 | Riedel | 128/156 |
| 4,968,540 | 11/1990 | Linsenbigler | 428/5 |
| 4,994,322 | 2/1991 | Delgado et al. | 428/343 |
| 4,995,641 | 2/1991 | Landry et al. | 283/67 |
| 5,050,909 | 9/1991 | Mertens et al. | 283/81 |
| 5,109,083 | 4/1992 | Hsieh et al. | 526/93 |
| 5,118,750 | 6/1992 | Silver et al. | 524/462 |
| 5,145,929 | 9/1992 | Ou-Yang | 526/338 |
| 5,153,041 | 10/1992 | Clements et al. | 428/40 |
| 5,185,212 | 2/1993 | Spada et al. | 428/483 |
| 5,194,329 | 3/1993 | Hsieh et al. | 428/332 |
| 5,198,301 | 3/1993 | Hager et al. | 428/355 |
| 5,204,390 | 4/1993 | Szymanski et al. | 524/91 |
| 5,215,818 | 6/1993 | Silver et al. | 428/343 |
| 5,240,989 | 8/1993 | Bernard et al. | 524/560 |
| 5,262,479 | 11/1993 | Tobing | 525/71 |
| 5,284,689 | 2/1994 | Laurash et al. | 428/40 |
| 5,286,546 | 2/1994 | Su | 428/194 |
| 5,299,833 | 4/1994 | Madole, Jr. | 281/2 |
| 5,334,094 | 8/1994 | Armbruster et al. | 462/17 |
| 5,348,780 | 9/1994 | Boggs et al. | 428/42 |
| 5,362,816 | 11/1994 | Snyder et al. | 525/329.9 |
| 5,366,776 | 11/1994 | Mertens | 428/40 |
| 5,371,137 | 12/1994 | Blincow et al. | 524/564 |
| 5,382,055 | 1/1995 | Mertens et al. | 283/67 |
| 5,389,438 | 2/1995 | Miller et al. | 428/355 |
| 5,391,406 | 2/1995 | Ramharack et al. | 427/516 |
| 5,391,602 | 2/1995 | Skoultchi | 524/392 |
| 5,411,168 | 5/1995 | Mertens et al. | 221/22 |
| 5,416,127 | 5/1995 | Chandran et al. | 522/149 |
| 5,420,195 | 5/1995 | Mayer et al. | 524/556 |
| 5,434,213 | 7/1995 | Chen et al. | 524/533 |
| 5,435,879 | 7/1995 | Knutson et al. | 156/327 |

REMOVABLE ADHESIVE NOTES FOR AN INDUSTRIAL SETTING

BACKGROUND OF THE INVENTION

1. Field of the Invention

This invention is in the field of removable adhesive sheets capable of receiving markings and processes for making them.

2. Description of Related Art

POST-IT™ note pads made by the Minnesota Mining and Manufacturing Company (3M) are well known pads of sheets that may be cleanly removed and reapplied a number of times without loss of tackiness. This attribute is obtained through the use of tacky microspheres coated onto a paper substrate as disclosed in U.S. Pat. No. 3,691,140.

An adhesive that is said to afford properties similar to that used in POST-IT™ note pads is described in U.S. Pat. No. 4,684,685. In that patent, an adhesive is described which includes a natural rubber latex and a tackifier which is an anionic aqueous dispersion of hydrogenated rosin or rosin esters.

U.S. Pat. No. 5,389,438 describes a hot-melt coatable low-tack pressure-sensitive adhesive comprising from 20 to 80 parts by weight of a styrene/butadiene, styrene/isoprene, or styrene/ethylene-butylene block copolymer elastomer and from 80 to 20 parts by weight of a tackifying material selected from tackifier resins or blends and blends of tackifier resin with liquid plasticizer oil. This adhesive is required to have a composite mid-block glass transition temperature within a certain range which depends on the composition of the elastomeric block copolymer. Column 4, lines 63 et seq., and column 11, lines 17 et seq., teach that stripes of this adhesive can be coated onto paper which is then cut and stacked to form a tablet or note pad of repositionable sheets like the POST-IT™ note pads.

Although paper labels coated with a low-tack repositionable pressure-sensitive adhesive have been a phenomenal success in the office setting in which the note is typically applied to a paper surface, the inventors have found that such notes perform poorly on substrates which have an irregular surface and/or have a surface with low surface energy or contamination which reduces the effectiveness of the adhesive. Such surfaces are prevalent in industrial settings, research and development laboratories, the construction industry, warehouses, and other settings which require the ability to post temporary notes on non-paper surfaces. Notes of the POST-IT™ type either fail to adhere or form such a weak bond with such surfaces that they fail to conform to the surface of an irregular shape and/or fail to maintain adhesion.

SUMMARY OF THE INVENTION

The problem of providing removable adhesive sheets capable of receiving markings and adhering to irregular or low surface energy substrates is solved by the present invention.

One aspect of this invention is a pad comprising a stack of a plurality of adhesive sheets alternating with release sheets adhered to the back of each adhesive sheet, wherein A. each adhesive sheet is removable from a substrate without leaving an adhesive residue and comprises a flexible polymer film, polymer-reinforced sheet or cloth having a Taber stiffness of not less than 0.03 measured according to ASTM D747, a front side capable of receiving markings and a back side substantially covered with a pressure sensitive adhesive having an initial tack value of at least 200 g measured according to ASTM D2979 on a Polyken™ probe tack tester, an adhesive tack sufficient to prevent conformability failure of the adhesive sheet after 10 hours conformability testing, and an adhesive strength of at least 100N/m according to ASTM D1000 and B. each release sheet covers at least 50 percent of the pressure sensitive adhesive on the back of each adhesive sheet.

Another aspect of this invention is a process for making pads for posting removable adhesive notes comprising:

A. Coating the back side of flexible polymer film, polymer-reinforced sheet or cloth with a pressure-sensitive adhesive to make adhesive sheets, the flexible polymer film, polymer-reinforced sheet or cloth having a Taber stiffness of not less than 0.03 measured according to ASTM D747 and a front side capable of receiving markings and the adhesive having an initial tack value of at least 200 g measured according to ASTM D2979 on a Polyken™ probe tack tester, an adhesive tack sufficient to prevent conformability failure of the adhesive sheet after 10 hours conformability testing, and an adhesive strength of at least 100N/m according to ASTM D1000;

B. Adhering a release sheet to the back side of the adhesive sheet prepared according to step A such that it covers at least 50 percent of the pressure sensitive adhesive on the back of each adhesive sheet;

C. Assembling a plurality of the adhesive sheet/release sheet combinations prepared according to step B by stacking them on top of each other such that the edges of each adhesive sheet/release sheet combination lines up substantially vertically with the one below it; and D. Binding one edge of the assembly prepared according to step C such that each adhesive sheet/release sheet combination may be removed singly from the top of that assembly.

Yet another aspect of this invention is a kit for dispensing removable notes comprising:

A. A plurality of adhesive sheet/release sheet combinations wherein each release sheet is adhered to the back side of an adhesive sheet and each adhesive sheet is removable from a surface without leaving an adhesive residue and comprises a flexible polymer film, polymer-reinforced sheet or cloth having a Taber stiffness of not less than 0.03 measured according to ASTM D747, a front side capable of receiving markings and a back side substantially covered with a pressure sensitive adhesive having an initial tack value of at least 200 g measured according to ASTM D2979 on a Polyken™ probe tack tester, an adhesive tack sufficient to prevent conformability failure of the adhesive sheet after 10 hours conformability testing, and an adhesive strength of at least 100N/m according to ASTM D1000 and B. A dispenser adapted to hold a plurality of the adhesive sheet/release sheet combinations and dispense those combinations as few as one at a time.

DETAILED DESCRIPTION OF THE INVENTION

Figure 1:
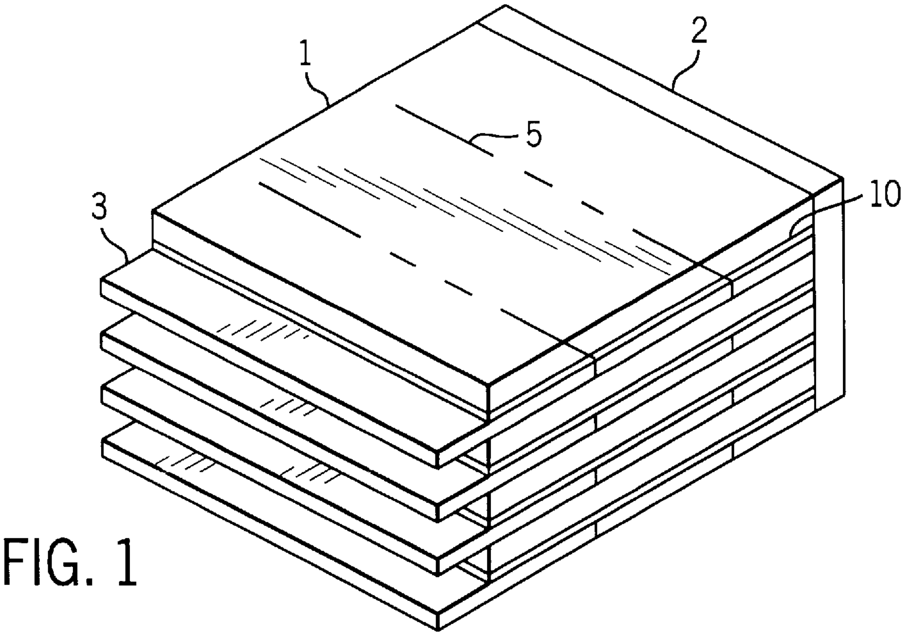
FIG. 1 shows an edge-glued pad of removable adhesive sheet/release sheet combinations having extended release sheets.

An important aspect of the present invention is the selection of an adhesive which combines an initial tack value of at least 200 g according to ASTM D2979 measured on a Polyken™ probe tack tester, an adhesive strength of at least 100N/m according to ASTM D1000 and an adhesive tack sufficient to prevent conformability failure of the adhesive sheet after 10 hours conformability testing (which is further described below) and yet having a cohesive strength sufficient to allow removal of the note from the substrate without leaving any residue behind on the substrate.

Typically, the adhesives which are useful in the present invention comprise an elastomeric polymer. Examples of useful elastomeric polymers include natural rubber, styrene/diene rubber such as styrene/butadiene block copolymer, styrene/isoprene block copolymer, styrene/ethylene-butylene block copolymer, polyisobutylene rubber, and acrylic elastomer. Specific examples of elastomeric polymers include Heveacrumb™ (natural rubber) available from Herron & Meyer, Synpol™ (a styrene/butadiene copolymer rubber) available from Ameripol Synpol Corp., Vistanex™ (a polyisobutylene elastomer) available from Exxon Chemical, Duro-Tak™ (an acrylic resin elastomeric adhesive) available from National Starch and Chemical Corp., and Aroset™ (a modified acrylic resin elastomeric adhesive) available from Ashland Chemical, Inc.

The adhesives useful in the present invention also may contain one or more tackifier resins such as rosin, hydrogenated rosin, rosin ester, synthetic hydrocarbon tackifier, and low molecular weight, low glass transition temperature polycarboxylic acid esters. Preferred tackifiers include rosin esters, polyterpenes, and polybutenes. Specific examples of tackifier resins include Foral™ ( a rosin ester tackifier) and Piccolyte™ (a polyterpene tackifier), both available from Hercules, Inc., and Indopol™ (a polybutene tackifier) available from Amoco Chemicals Corp.

Antioxidants are employed to the extent necessary to prevent degradation of the adhesive with time. Examples include hydroquinone and hindered phenol antioxidants. Specific examples of antioxidants include Santovar A (2,5-di-tert-amylhydroquinone antioxidant) available from Flexsys America L.P., Agerite Resin D (polymerized 1,2-dihydro-2,2,4-trimethylquinoline monomer) available from R. T. Vanderbilt Co. and Wingstay L (butylated reaction product of p-cresol and dicyclopentadiene) available from Goodyear Tire & Rubber Co.

Adhesive formulations may include a plasticizer, such as a polyketone resin, and/or a surfactant, such as Tween™, a polysorbate 20 surfactant available from ICI Specialties Mfg.

When the adhesive contains a tackifier, the tackifier may be present in a wide range of amounts, depending on the amount required to achieve the required initial tack value, adhesive tack and adhesive strength. In one embodiment, the adhesive has a weight ratio of tackifier to elastomer in the range from 0.5 to 2.0:1, preferably in the range from 0.8 to 1.8:1.

The adhesive has an initial tack value of at least 200 g, preferably at least 300 g, measured according to ASTM D2979 on a Polyken™ probe tack tester, an adhesive tack sufficient to prevent conformability failure of the adhesive sheet after 10 hours, preferably after 24 hours, conformability testing (described below), and an adhesive strength of at least 100N/m, preferably at least 200N/m, according to ASTM D1000.

The adhesive preferably has a high cohesive strength to prevent adhesive residue from remaining on the substrate when the adhesive sheet is removed. One method for determining cohesive strength is to conduct a shear strength test according to ASTM D3654-88, PSTC-7 (PSTC refers to the Pressure Sensitive Tape Council) to determine whether the adhesive undergoes cohesive failure at the conclusion of that test. This test is further described below.

For applying the adhesive to a flexible polymer film, polymer-reinforced sheet or cloth, appropriate types and amounts of curing agent, accelerator and solvent are typically included in the adhesive formulation. Examples of curing agents include zinc oxide, such as ASARCO available from Jenson-Sauders Associates, Inc., and melamine resin such as Uformite™ available from Reichhold Chemical Coating Division. Examples of accelerators include zinc dithiocarbamates such as Methyl Zimate™ (zinc dimethyldithiocarbamate) and thiuram sulfides such as Sulfads™ (dipentamethylene thiuram hexasulfide), both available from R.T. Vanderbilt Co. Examples of useful solvents include toluene, heptane, xylene, methyl ethyl ketone, isopropyl alcohol and ethyl acetate.

In one preferred embodiment of this invention, the adhesive formulation used to make the adhesive sheets comprises at least one elastomer, at least one tackifier, at least one antioxidant, at least one curing agent, at least one accelerator, and at least one solvent. The elastomer is preferably present in an amount of at least 5 wt %, more preferably at least 10 wt %, up to 25 wt %, more preferably up to 20 wt %. The tackifier is preferably present in an amount of at least 5 wt %, more preferably at least 10 wt %, up to 40 wt %, more preferably up to 30 wt %. The curing agent is preferably present in an amount of at least 0.1 wt % up to 10 wt %. The accelerator is preferably present in an amount from 0.1 to 1 wt %.

In another preferred embodiment of this invention, the adhesive formulation used to make the adhesive sheets comprises at least one acrylic-based adhesive in an appropriate solvent.

One approach to preparing an adhesive for use in this invention is to add elastomeric polymer, antioxidant, curing agent and accelerator to a tackifier resin which has been thinned with an appropriate solvent, adding additional appropriate solvent as needed.

Curing of the adhesive may be activated by any conventional method, such as by exposure to air, elevated temperatures and/or radiation. Examples of radiation include ultraviolet light and actinic radiation. Curing via exposure to radiation includes the use of curing initiators which generate sufficient free radicals upon exposure to the selected radiation to initiate curing of the adhesive. Such initiators are well known in the polymer curing art.

In yet another preferred embodiment of this invention, the adhesive is formulated with little or no solvent for application as a hot melt thermoplastic adhesive. Hot melt thermoplastic adhesives typically contain little or no solvent. Any of a wide range of thermoplastic adhesives may be used as long as they comply with the conditions set forth above. They are commercially available from several manufacturers. Examples include HL-2194-X, HM-2703, HL-2198-X and HL-2268-X available from H. B. Fuller Co.; Duro-Tak™ 9820, 6123, 4136 and 1236 available from National Starch and Chemical Corp.; CA-501 (SIS/SBS), CA-502-4A (SIS/SBS), CA-503-A (SIS/SBS), CA-506 (SIS/SBS), C-X805-1 (Acrylic), C-882 (Acrylic), and C-X885 (Acrylic) available from Century International and H2091, H2114-01, and 801-375 available from Findley Adhesives, Inc. Suitable hot melt thermoplastic adhesives are also disclosed, for example, in U.S. Pat. No. 4,728,572, which is incorporated herein by reference.

The adhesive is applied to the back side of a flexible polymer film, polymer-reinforced sheet or cloth having a Taber stiffness of not less than 0.03, preferably not less than 0.05, measured according to ASTM D747. The polymer film, polymer-reinforced sheet or cloth preferably has a tensile strength of at least 2000, preferably 4000 and more preferably 5000, N/m, up to any value, such as up to 8000N/m and it also preferably has a minimum elongation of at least about 4 percent and more preferably at least about 50 percent, the tensile strength and percent minimum elongation being measured according to ASTM D1000.

The film, sheet or cloth may be selected from a wide range of materials. Examples include polymer films made of natural and/or synthetic polar and/or nonpolar materials such as polyolefins, e.g., homopolymers and interpolymers derived from substituted and unsubstituted olefinically unsaturated hydrocarbons including ethylene, propylene, styrene, butadiene, dicyclopentadiene, etc., and materials which contain polar functional groups such as hydroxys, etherals, carbonyls, carboxylic acids (including salts thereof), carboxylic acid esters (including thio esters), carboxylic anhydrides, amides, amines, etc. Synthetic materials having polar groups are preferred. Illustrative examples include polyesters, polyamides, and carboxylated styrene-butadiene polymers.

The polymer-reinforced sheets comprise at least one of the natural or synthetic polymers described above together with a reinforcing material. The reinforcing material may be organic or inorganic. Illustrative organic materials include natural materials such as cellulosic fibers such as cotton, paper, hemp, etc., and synthetic materials such as fibers made of the aforementioned natural or synthetic polymers. Inorganic materials include any of the many well known fillers used in the plastics industry such as silica, talc, mica, etc.

The cloth is one that is woven from natural or synthetic fibers. The natural fibers are preferably cotton and the synthetic fibers are preferably polar interpolymers derived from olefinically unsaturated hydrocarbons.

The front surface of the film, sheet or cloth is capable of receiving markings. This capability is either an inherent property of the film, sheet or cloth or is obtained by a treatment of its surface using conventional means known in the art. Preferably the front surface is capable of receiving markings with a ballpoint pen, a marking pen or a pencil. It is also preferable that the front surface be capable of absorbing ink such as ballpoint or marking pen ink into the surface to reduce potential smearing of the ink after it is applied.

The film, sheet or cloth may be scored or perforated to allow for selective removal from the release sheet and/or to allow for removal from a binding, such as a glued, stapled, posted or wired edge binding.

The adhesive may be applied to the above films, sheets and cloths in a conventional manner, such as by spraying, knife coating, roller coating, casting, drum coating, extrusion coating, coextrusion coating, and the like or unsupported pressure sensitive adhesive may be transferred or laminated to the film, sheet or cloth. The adhesive is preferably coated in a manner which covers substantially the entire back side of the film, sheet or cloth. The adhesive is preferably coated at a thickness in the range from 0.5 to 3 mil, more preferably in the range from 1 to 3 mil.

A release sheet is applied to the adhesive-coated side of the adhesive sheet so that it covers at least 50 percent of the adhesive-coated area. In one embodiment, the release sheet covers the entire adhesive-coated area of the adhesive sheet. The release sheet may be any material that has less adhesion to the adhesive than the adhesive substrate and has sufficient strength to resist tearing as it is removed from the adhesive. The release property of the release sheet may be inherent in the material of the release sheet or may be due to the presence of a release agent on the surface of the release sheet, or both. Materials having an inherent release property include those made of a synthetic nonpolar material, such as homopolymers derived from unsaturated olefins, e.g., polyethylene, polypropylene, etc., and release agents include, for example, silicone-containing agents. The release sheet preferably has a Taber stiffness measured according to ASTM D747 greater than that of the adhesive sheet.

In one embodiment, each release sheet extends beyond the adhesive sheet to which it is adhered in at least one direction. In such an embodiment, each release sheet may, for example, extend beyond the adhesive sheet by at least 2 millimeters (mm.). Each release sheet may extend beyond the adhesive sheet to which it is adhered in one direction, preferably in the same direction, relative to the pad for each release sheet. The extended part of the release sheet is preferably on the side of the pad opposite the side on which the pad is bound together.

In another embodiment, the release sheet is scored with at least one score line to allow selective removal of the release sheet. This permits selective amounts of adhesive surface area to be exposed on the back of the adhesive sheet, so that the end user can select whether to adhere the entire back side of the adhesive sheet to the surface in order to affix it semi-permanently or affix just part of the back side of the adhesive sheet to the surface so that a nonadhered end of the note remains to facilitate removal and/or repositioning of the note. The score line(s) are preferably substantially straight, traverse(s) the adhesive sheet from edge to edge and dissect (s) the release sheet into at least two separable parts.

The scoring of release sheets may be combined with scoring or perforating of the film, sheet or cloth described above to permit removal of each film, sheet or cloth together with its release sheet for various edge binding and dispensing means. In one embodiment, the perforation or scoring of the film, sheet or cloth includes a score line parallel with but offset from a release sheet score line. Such offset score or perforation lines are preferably between that release sheet score line and the edge binding and is preferably substantially parallel to both. The offset is preferably at least 2 mm, such as at least 5 mm, and preferably less than half the distance between the edge binding and the opposite edge of the release sheet.

The pad comprising a stack of a plurality of adhesive sheets with release sheets adhered to the back of each adhesive sheet may be assembled using conventional techniques for assembling note pads. Examples include assembling a stack of adhesive sheets with release sheets, optionally cutting the stack into smaller stacks and edge glueing, stapling, posting or wiring the stacks on one edge either before or after the optional cutting step. The stacks may be assembled so that the release sheets extend beyond the edge of the adhesive sheets on at least one edge to facilitate removal of adhesive sheets with their respective release sheets one at a time.

Alternatively, the adhesive sheets having release sheets may be stacked in a dispenser adapted for receiving and dispensing such adhesive sheet/release sheet combinations. The dispenser may be any appropriate shape, such as in the shape of a box with an open top. The dispenser can also have removable adhesive on the outside bottom surface for adhering it temporarily or semi-permanently to a surface. The removable adhesive may be selected from those described above as the adhesive for the adhesive sheets. When the dispenser is put on the market, the adhesive on the bottom would preferably be covered with a release sheet.

FIGS. 1–7 show examples of embodiments of the invention and components for making those embodiments.

FIG. 1 shows a pad of multiple adhesive sheets 1 and release sheets 3. Each release sheet is adhered to an adhesive sheet 1 with adhesive 10. The pad is edge glued with an edge binding material 2. This embodiment has an extended release sheet 3 to allow for easy removal of each adhesive sheet/release sheet combination and score lines 5 to permit selective removal of release sheet 3.

Figure 2:
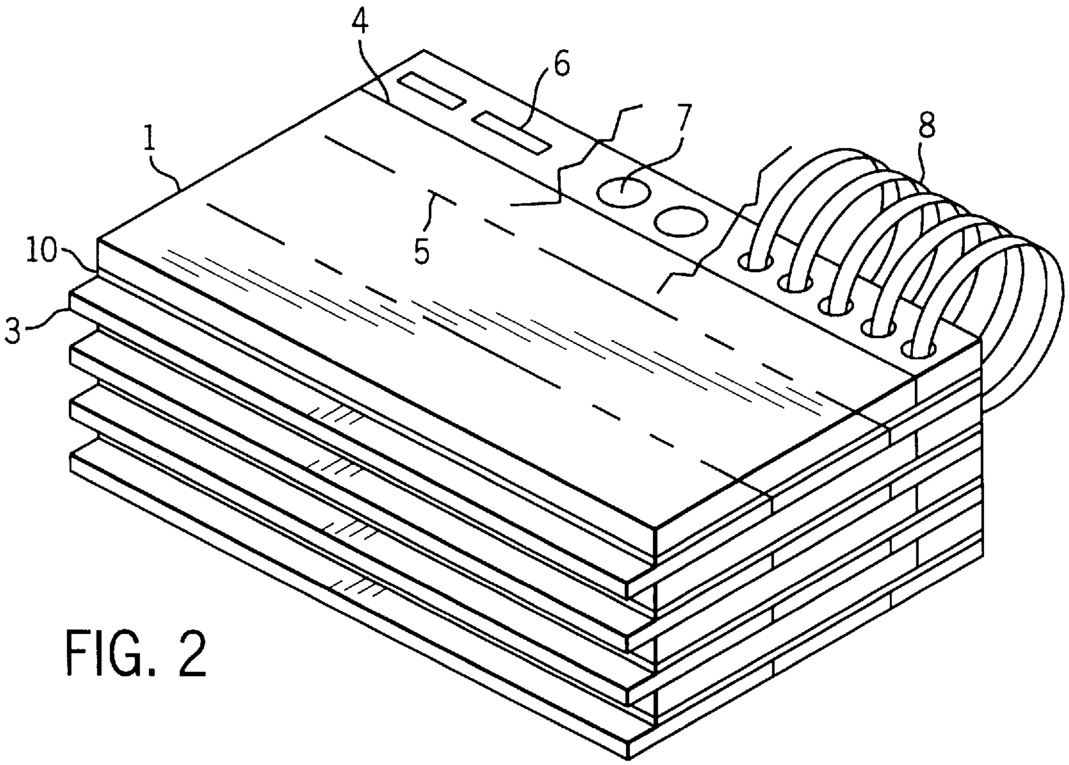
FIG. 2 shows a pad of stapled, posted or wired removable adhesive sheet/release sheet combinations having extended release sheets.

FIG. 2 shows a pad of multiple adhesive sheets 1 having adhesive 10 and release sheets 3 which is stapled 6, posted 7 or wired 8 on one edge. The release sheet 3 is extended to allow for easy removal of the adhesive sheet 1/release sheet 3 combination and scored with score lines 5.

Figure 3:
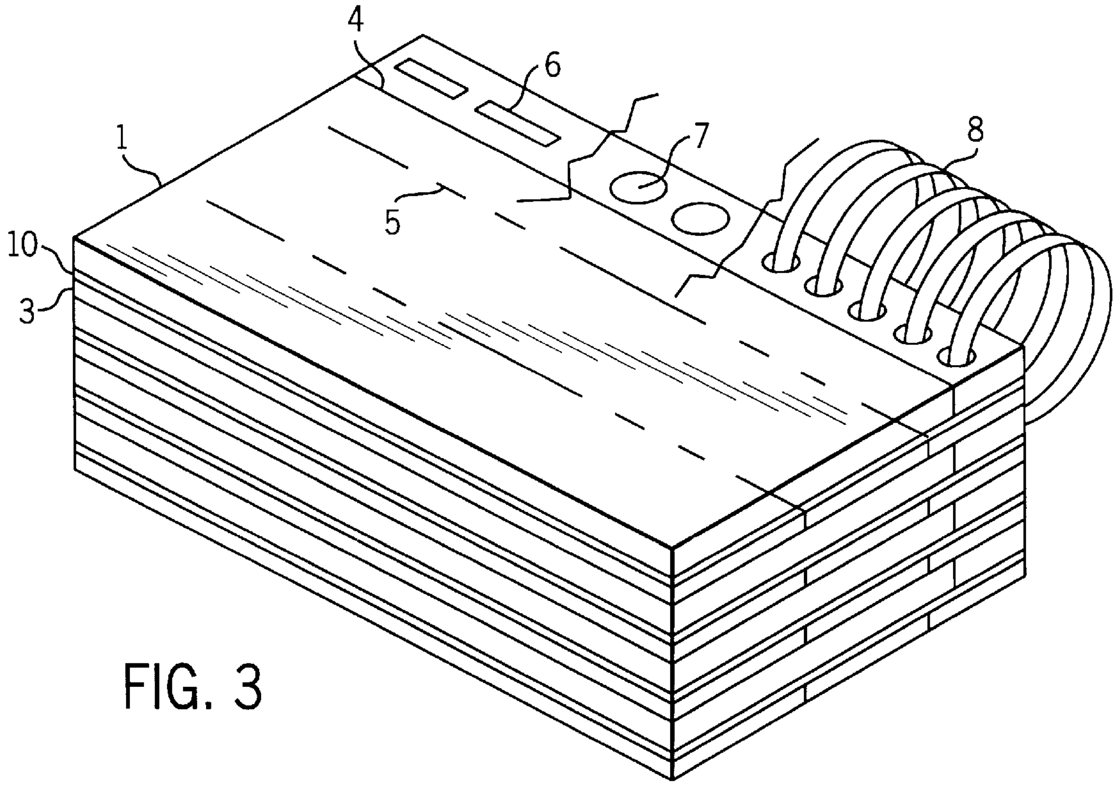
FIG. 3 shows a pad of stapled, posted or wired removable adhesive sheet/release sheet combinations having release sheets which are flush with the edges of the pad.

FIG. 3 is a pad of multiple adhesive sheets 1 having adhesive 10 and scored 5 release sheets 3 bound the same way as in FIG. 2 except that the pad has flush release sheets 3.

Figure 4:
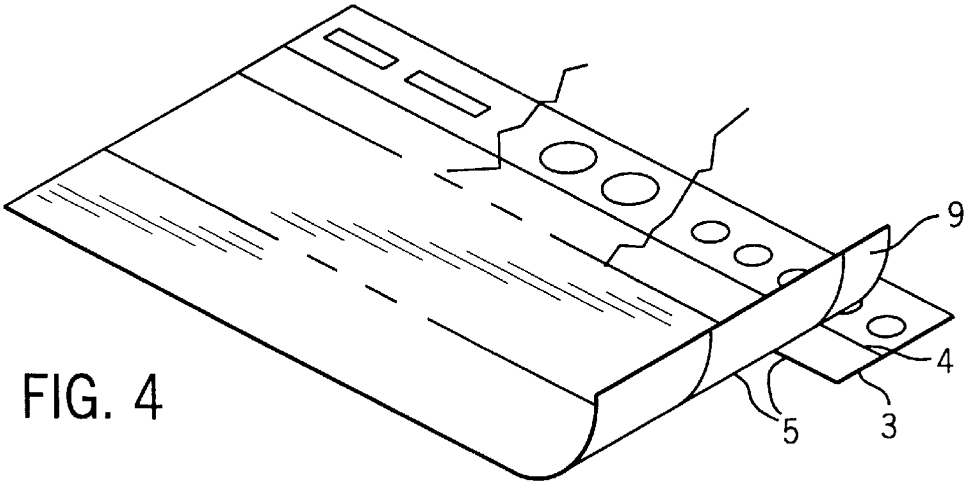
FIG. 4 shows an adhesive sheet having a score line attached to a release sheet having score lines with the adhesive sheet partially removed from the release sheet.

FIG. 4 shows an adhesive sheet/release sheet combination which may be used in the pad of FIGS. 2 or 3. The release sheet 3 is scored with score lines 5 while the adhesive sheet 1 is scored with perforation/score line 4. The score line 5 allows for selective removal of release sheet 3 to expose selective amounts of adhesive surface area on the back of adhesive sheet 1. In addition, perforation/score line 4 of the adhesive sheet 1 allows the adhesive and release sheet combination to be removed from the stapled 6, posted 7 or wired 8 edge of a pad as shown in the peeled-away portion of FIG. 4. This design helps avoid premature separation of adhesive sheet/release sheet combinations from the pad, such as by accidental grabbing of more than one combination at a time, because removal of an adhesive sheet/release sheet combination from such pads requires the user to not only tear the perforation/score lines(s), but also peel the combination from the part that remains bound to the pad. This design also provides an exposed adhesive area that might be used for posting the adhesive note.

Figure 5:
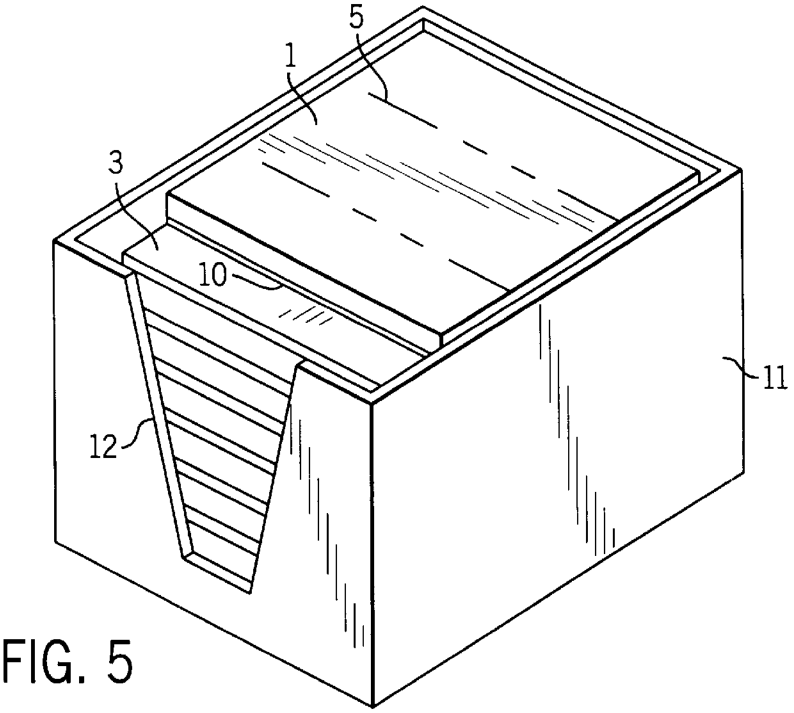
FIG. 5 shows adhesive sheet/release sheet combinations stacked in a dispenser.

FIG. 5 shows a dispenser 11 with adhesive sheet 1/release sheet 3 combinations having extended release sheets 3 with score lines 5 stacked inside. This dispenser 11 is in the shape of a box with an open top having a slot 12 to facilitate removal of individual adhesive sheet/release sheet combinations. The dispenser 11 can also have removable adhesive on the outside bottom surface for adhering it to a substrate. When sold, the adhesive would be covered with a release sheet.

Figure 6:
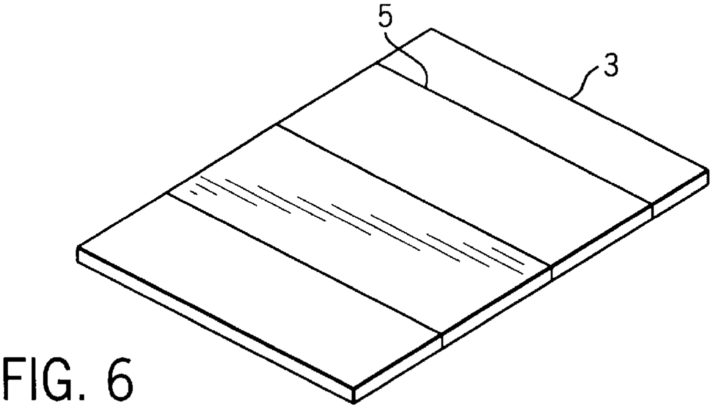
FIG. 6 shows a scored release sheet.

FIG. 6 shows a release sheet 3 for use with an adhesive sheet 1 as shown in FIGS. 1–5 and 7, the release sheet having score lines 5 which allow for selective removal of the release sheet 3 in order to expose selective amounts of adhesive surface area on the back side of the adhesive sheet 1.

Figure 7:
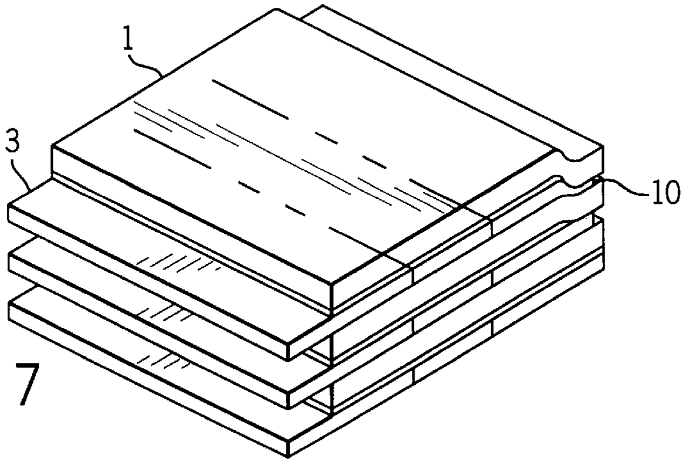
FIG. 7 shows a pad of removable adhesive sheet/release sheet combinations bound label-to-label with extended release sheets.

FIG. 7 shows a pad of multiple adhesive sheets 1 and release sheets 3. Each adhesive sheet 1 is adhered to another adhesive sheet 1. This embodiment is bound label-to-label with extended offset release sheets 3 to allow for easy removal of each adhesive sheet 1/release sheet 3 combination. The offset of the release sheet 3 exposes the adhesive 10 of the adhesive sheet 1 by which it is attached to the adhesive sheet 1 below.

The pads described herein are useful for posting notes in an industrial setting, including production plants, research and development laboratories, construction sites, warehouses, and other non-office environments. They are also useful in the office environment for applications in which typical repositionable notes are not sufficiently robust, such as for posting on shelving and office equipment. The notes may be blank or may be pre-printed with words, logos or other insignia.

The invention is illustrated by the examples which follow. These examples are not to be construed as limiting the scope of the invention, which is defined by the appended claims.

TEST METHODS

Test for Conformability

A sample of the rectangular adhesive sheet measuring 0.5 inch by 1.5 inch is applied to a clean, polished half-inch diameter stainless steel cylinder such that the short side is oriented along the axis of the cylinder and the long side is oriented along the circumference of the cylinder, known as "flagging". The cylinder is then exposed to a temperature of 77°±5° F. and a relative humidity not greater than 80% for a period of 10 hours.

Conformability failure is indicated by opening up of the flags, i.e., visible edge separation, at the conclusion of the 10 hour test. It is a pass/fail test.

Test for Cohesive Strength

Cohesive strength may be determined indirectly by measuring the shear strength of the adhesive according to ASTM D3654-88, also known as PSTC-7, and recording whether adhesive is left on both the adhesive sheet and the panel to which it was adhered after failure. In this case, PSTC-7 has been modified to use 1×0.5 inch samples. A sample of the rectangular adhesive sheet measuring 1×0.5 inch is applied to a vertical stainless steel panel with a 0.5 inch overlap joint. A mass of 1000 g is suspended from the sample and the time until failure is measured in an environment having a temperature of 23° C. and a relative humidity of 50 percent. A determination is then made whether adhesive is left on both the tape and the panel by visual inspection. If there is, the test shows cohesive failure.

If there is no adhesive left on the panel, the test indicates adhesive failure to the panel, i.e., the cohesive strength is greater the shear strength of the bond to the panel, and the adhesive passes the test for cohesive strength.

If there is some or no adhesive left on the adhesive sheet and it has been transferred to the panel, the test does not provide information about the cohesive strength of the adhesive, but rather shows failure of the adhesive to form a sufficient adhesive bond to the backing material of the adhesive sheet. This indicates the need for either another adhesive, another backing material, or the need to pre-treat the surface of the backing material to be coated with adhesive such that it forms a stronger bond with the adhesive, such as with a sizing agent.

EXAMPLES

The following are examples of formulations of adhesives which are usefull for making the adhesive sheets in the pads according to the present invention. These formulations may be coated or transferred onto any of the films, sheets or cloths described above as useful for making the adhesive sheets.

TABLE I

| COMPOSITION OF FORMULATIONS A, B AND C IN WEIGHT-PERCENT | | | |
|---|---|---|---|
| INGREDIENT | A | B | C |
| Heveacrumb ™ SMR-5LX Lamco[1] | 3.86 | — | 10.18 |
| Synpol ™ Type 1011A[2] | 11.58 | 17.02 | — |
| Vistanex MM-L-80[3] | — | — | 2.60 |
| Foral ™ 105[4] | 18.52 | 15.32 | — |
| Piccolyte S-115[5] | — | — | 14.73 |
| Herolyn D[6] | — | — | 3.12 |
| Indopol H-100[7] | — | — | 3.12 |
| Santovar ™ A[8] | 0.15 | 0.09 | — |
| Agarite ™ Resin D[9] | 0.08 | 0.09 | — |
| Wingstay ™ L Powder[10] | — | — | 0.14 |
| ASARCO ™ ZO-77T[11] | 7.72 | 8.51 | 0.64 |
| Methyl Zimate[12] | 0.62 | 0.68 | 0.50 |
| Sulfads ™ Powder[13] | 0.04 | 0.04 | — |
| Tween ™ 20[14] | — | — | 0.12 |
| K-1717B[15] | — | — | 1.22 |
| Solvent | balance | balance | balance |

[1]Natural rubber elastomer available from Herron & Meyer
[2]Styrene butadiene copolymer elastomer available from American Synpol Corp.
[3]Polyisobutylene elastomer available from Exxon Chemical
[4]Rosin ester tackifier available from Hercules, Inc.
[5]Polyterpener resin tackifier available from Hercules, Inc.
[6]Hydrogenated methyl ester of rosin tackifier available from Hercules, Inc.
[7]Polybutene tackifier available from Amoco Chemical Corp.
[8]2,5-di-tert-amylhydroquinone antioxidant available from Flexsys America L. P.
[9]Antioxidant available from R. T. Vanderbilt Co.
[10]Antioxidant available from Goodyear Tire & Rubber Co.
[11]Zinc oxide curing agent available from Jenson-Souders Assocs., Inc.
[12]Zinc dimethyldithiocarbamate accelerator available from R. T. Vanderbilt Co.
[13]Dipentamethylene thiuram hexasulfide accelerator available from R. T. Vanderbilt Co.
[14]Polysorbate 20 surfactant available from ICI Specialties Mfg.
[15]Polyketone resin plasticizer available from Lawter Chemical, Inc.

Formulation D

An acrylic-based adhesive formulation D is prepared by combining 99.72 wt % Duro-Tak™ 80-1047 (an acrylic resin available from National Starch and Chemical Co.) with 0.17 wt % Uformite-27-803 (a melamine resin curing agent available from Reichhold Chemical Coating Div.) in an appropriate solvent (balance).

Formulation E

Another acrylic-based adhesive formulation is prepared by diluting Aroset™ 1044Z-40 (an acrylic resin adhesive available from Ashland Chemical, Inc.) with an appropriate solvent so that the resin comprises 39–41 wt % of the formulation.

Formulation F

Yet another acrylic-based adhesive formulation F is prepared by diluting Aroset™ 1085-Z-38 (an acrylic resin adhesive also available from Ashland Chemical) with an appropriate solvent so that the resin comprises 36.5–38.5 wt % of the formulation.

Although the invention has been described in considerable detail through the preceding specific embodiments, it is to be understood that these embodiments are for purpose of illustration only. Many variations and modifications can be made by one skilled in the art without departing from the spirit and scope of the invention.

What is claimed is:

1. A pad comprising a stack of a plurality of adhesive sheets alternating with release sheets adhered to the back of each adhesive sheet, wherein A. each adhesive sheet is removable from a surface without leaving an adhesive residue and comprises a flexible polymer film, polymer-reinforced sheet or cloth having a Taber stiffness of not less than 0.03 measured according to ASTM D747, a front side capable of receiving markings and a back side substantially covered with a pressure sensitive adhesive having an initial tack value of at least 200 g measured according to ASTM D2979 on a Polyken™ probe tack tester, an adhesive tack sufficient to prevent conformability failure of the adhesive sheet after 10 hours conformability testing, and an adhesive strength of at least 100N/m according to ASTM D1000 and B. each release sheet covers the entire adhesive-coated area on the back of the adhesive sheet to which it is adhered.

2. The pad of claim 1, wherein the film, sheet or cloth has a tensile strength of at least 2000N/m and a minimum elongation of 4 percent, each measured according to ASTM D1000.

3. The pad of claim 1, wherein the film, sheet or cloth has a tensile strength of at least 5000N/m and a minimum elongation of at least 50 percent, each measured according to ASTM D1000.

4. The pad of claim 1, wherein each release sheet extends beyond at least one edge of the adhesive sheet to which it is adhered.

5. The pad of claim 1, wherein the release sheet is scored with at least one score line to permit selective removal of at least one portion of the release sheet while leaving the remaining release sheet intact in order to expose a selected amount of the pressure sensitive coating surface area on the back surface of each sheet.

6. The pad of claim 5, wherein the film, sheet or cloth is scored or perforated with at least one score or perforation line to allow for separation from the pad by tearing or pulling.

7. The pad of claim 6, wherein the pad is bound on one edge and one film, sheet or cloth score line is parallel with and offset between the bound edge and a release sheet score line.

8. The pad of claim 1, wherein the adhesive comprises an acrylic-based polymer.

9. The pad of claim 1, wherein the adhesive comprises an elastomer and a tackifier.

10. The pad of claim 9, wherein the elastomer is a natural rubber, an elastomeric block copolymer or polyisobutylene elastomer, or a combination of two or more thereof.

11. The pad of claim 10, wherein the elastomer is a combination of a natural rubber and a styrene/isoprene block copolymer.

12. The pad of claim 11, wherein the weight ratio of tackifier to elastomer is greater than 0.8:1.

13. The pad of claim 12, wherein the tackifier is a rosin ester.

14. A process for making pads for posting removable adhesive notes comprising:

A. Coating the back side of flexible polymer film, polymer-reinforced sheet or cloth with a pressure-sensitive adhesive to make adhesive sheets, the flexible polymer film, polymer-reinforced sheet or cloth having a Taber stiffness of not less than 0.03 measured according to ASTM D747 and a front side capable of receiving markings and the adhesive having an initial tack value of at least 200 g measured according to ASTM D2979 on a Polyken™ probe tack tester, an adhesive tack sufficient to prevent conformability failure of the adhesive sheet after 10 hours conformability testing, and an adhesive strength of at least 100 N/m according to ASTM D1000;

B. Adhering a release sheet to the back side of the adhesive sheet prepared according to step A such that it covers the entire adhesive-coated area on the back of the adhesive sheet;

C. Assembling a plurality of the adhesive sheet/release sheet combinations prepared according to step B by stacking them on top of each other such that the edges of each adhesive sheet/release sheet combination lines up substantially vertically with the one below it; and D. Binding one edge of the assembly prepared according to step C such that each adhesive sheet/release sheet combination may be removed singly from the top of that assembly.

15. The process of claim 14, wherein step B includes adhering each release sheet to the back side of an adhesive sheet such that the release sheet extends beyond at least one edge of the adhesive sheet to which it is adhered.

16. The process of claim 15, wherein the film, sheet or cloth has a tensile strength of at least 2000N/m and a minimum elongation of 4 percent, each measured according to ASTM D1000.

17. A kit for dispensing removable notes comprising:

A. A plurality of adhesive sheet/release sheet combinations wherein each release sheet is adhered to the back side of an adjacent adhesive sheet and each adhesive sheet is removable from a surface without leaving an adhesive residue and comprises a flexible polymer film, polymer-reinforced sheet or cloth having a Taber stiffness of not less than 0.03 measured according to ASTM D747, a front side capable of receiving markings and a back side substantially covered with a pressure sensitive adhesive having an initial tack value of at least 200 g measured according to ASTM D2979 on a Polyken™ probe tack tester, an adhesive tack sufficient to prevent conformability failure of the adhesive sheet after 10 hours conformability testing, and an adhesive strength of at least 100N/m according to ASTM D1000, each release sheet being adhered to the entire adhesive-coated surface on the back side of an adjacent adhesive sheet and B. A dispenser adapted to hold a plurality of the adhesive sheet/release sheet combinations and dispense those combinations as few as one at a time.

18. A pad comprising a stack of a plurality of adhesive sheets alternating with release sheets adhered to the back of each adhesive sheet, wherein A. each adhesive sheet is removable from a surface without leaving an adhesive residue and comprises a flexible polymer film, polymer-reinforced sheet or cloth having a Taber stiffness of not less than 0.03 measured according to ASTM D747, a front side capable of receiving markings and a back side substantially covered with a pressure sensitive adhesive having an initial tack value of at least 200 g measured according to ASTM D2979 on a Polyken™ probe tack tester, an adhesive tack sufficient to prevent conformability failure of the adhesive sheet after 10 hours conformability testing, and an adhesive strength of at least 100N/m according to ASTM D1000 and B. each release sheet covers at least 50 percent of the pressure sensitive adhesive on the back of each adhesive sheet and has at least one score or perforation line to allow for selective removal of the release sheet.

19. The pad of claim 18, wherein the film, sheet or cloth has a tensile strength of at least 2000N/m and a minimum elongation of 4 percent, each measured according to ASTM D1000.

20. The pad of claim 18, wherein the film, sheet or cloth has a tensile strength of at least 5000N/m and a minimum elongation of at least 50 percent, each measured according to ASTM D1000.

21. The pad of claim 18, wherein each release sheet extends beyond at least one edge of the adhesive sheet to which it is adhered.

22. The pad of claim 18, wherein the film, sheet or cloth is scored or perforated with at least one score or perforation line to allow for separation from the pad by tearing or pulling.

23. The pad of claim 22, wherein the pad is bound on one edge and one film, sheet or cloth score line is parallel with and offset between the bound edge and a release sheet score line.

24. The pad of claim 18, wherein the adhesive comprises an acrylic-based polymer.

25. The pad of claim 18, wherein the adhesive comprises an elastomer and a tackifier.

26. The pad of claim 25, wherein the elastomer is a natural rubber, an elastomeric block copolymer or polyisobutylene elastomer, or a combination of two or more thereof.

27. The pad of claim 26, wherein the elastomer is a combination of a natural rubber and a styrene/isoprene block copolymer.

28. The pad of claim 27, wherein the weight ratio of tackifier to elastomer is greater than 0.8:1.

29. The pad of claim 28, wherein the tackifier is a rosin ester.

30. A process for making pads for posting removable adhesive notes comprising:

A. Coating the back side of flexible polymer film, polymer-reinforced sheet or cloth with a pressure-sensitive adhesive to make adhesive sheets, the flexible polymer film, polymer-reinforced sheet or cloth having a Taber stiffness of not less than 0.03 measured according to ASTM D747 and a front side capable of receiving markings and the adhesive having an initial tack value of at least 200 g measured according to ASTM D2979 on a Polyken™ probe tack tester, an adhesive tack sufficient to prevent conformability failure of the adhesive sheet after 10 hours conformability testing, and an adhesive strength of at least 100N/m according to ASTM D1000;

B. Adhering a release sheet to the back side of the adhesive sheet prepared according to step A such that it covers at least 50 percent of the pressure sensitive adhesive on the back of each adhesive sheet;

C. Making score or perforation lines in the release sheet to allow for selective removal of the release sheet from the adhesive sheet to which it is adhered;

D. Assembling a plurality of the adhesive sheet/release sheet combinations prepared according to step B by stacking them on top of each other such that the edges of each adhesive sheet/release sheet combination lines up substantially vertically with the one below it; and E. Binding one edge of the assembly prepared according to step C such that each adhesive sheet/release sheet combination may be removed singly from the top of that assembly.

31. The process of claim 30, wherein step B includes adhering each release sheet to the back side of an adhesive sheet such that the release sheet extends beyond at least one edge of the adhesive sheet to which it is adhered.

32. The process of claim 31, wherein the film, sheet or cloth has a tensile strength of at least 2000N/m and a minimum elongation of 4 percent, each measured according to ASTM D1000.

33. A kit for dispensing removable notes comprising:

A. A plurality of adhesive sheet/release sheet combinations wherein each release sheet is adhered to the back side of an adjacent adhesive sheet and has at least one score or perforation line to allow for selective removal of the release sheet from the adhesive sheet to which it is adhered and each adhesive sheet is removable from a surface without leaving an adhesive residue and comprises a flexible polymer film, polymer-reinforced sheet or cloth having a Taber stiffness of not less than 0.03 measured according to ASTM D747, a front side capable of receiving markings and a back side substantially covered with a pressure sensitive adhesive having an initial tack value of at least 200 g measured according to ASTM D2979 on a Polyken™ probe tack tester, an adhesive tack sufficient to prevent conformability failure of the adhesive sheet after 10 hours conformability testing, and an adhesive strength of at least 100N/m according to ASTM D1000 and B. A dispenser adapted to hold a plurality of the adhesive sheet/release sheet combinations and dispense those combinations as few as one at a time.

* * * * *